United States Patent [19]
Gesuale

[11] Patent Number: 5,873,593
[45] Date of Patent: Feb. 23, 1999

[54] PIGGYBACK TRUCK TRANSPORT SYSTEM

[76] Inventor: Thomas Gesuale, 36 Landview Dr., Dix Hills, N.Y. 11746

[21] Appl. No.: 745,825

[22] Filed: Nov. 12, 1996

[51] Int. Cl.$^6$ .......................................................... B60D 1/04
[52] U.S. Cl. .................................. 280/411.1; 280/33.991; 296/183; 220/1.5; 414/788.2
[58] Field of Search .................. 280/33.991, 33.998, 280/408, 410, 411.1, DIG. 8; 296/24.1, 183, 181; 180/89.1; 220/1.5; 414/788.2

[56] References Cited

U.S. PATENT DOCUMENTS

| | | | |
|---|---|---|---|
| 3,612,568 | 10/1971 | Stensrud | 220/1.5 |
| 3,966,075 | 6/1976 | Schultz | 220/1.5 |
| 4,015,876 | 4/1977 | Hulverson et al. | 296/183 |
| 4,021,074 | 5/1977 | Heiser | 296/24.1 |
| 4,599,040 | 7/1986 | Rasmussen | 220/1.5 |
| 4,867,468 | 9/1989 | Paul | 280/402 |
| 4,874,184 | 10/1989 | Boyer | 296/181 |
| 5,083,826 | 1/1992 | McCrary | 296/181 |
| 5,281,073 | 1/1994 | Gesuale | 220/1.5 |

*Primary Examiner*—Kevin Hurley
*Attorney, Agent, or Firm*—Ike Aruti, Esq.

[57] ABSTRACT

A nestable truck body is provided, having dimensions of height and width which increase from the front of the truck body to the back of the truck body do that the majority of the truck body is able to be nested within another empty truck body of similar construction, thereby enabling the storage of more than one truck body in little more space than is required to store one truck body. When this structure is combined with techniques for piggyback towing of bodiless trucks, a method for the simultaneous transportation of a plurality of trucks and bodies therefor is achieved, which may be further improved by reversal of the orientation of the last truck so that the bodies nested therein are carried more securely.

15 Claims, 3 Drawing Sheets

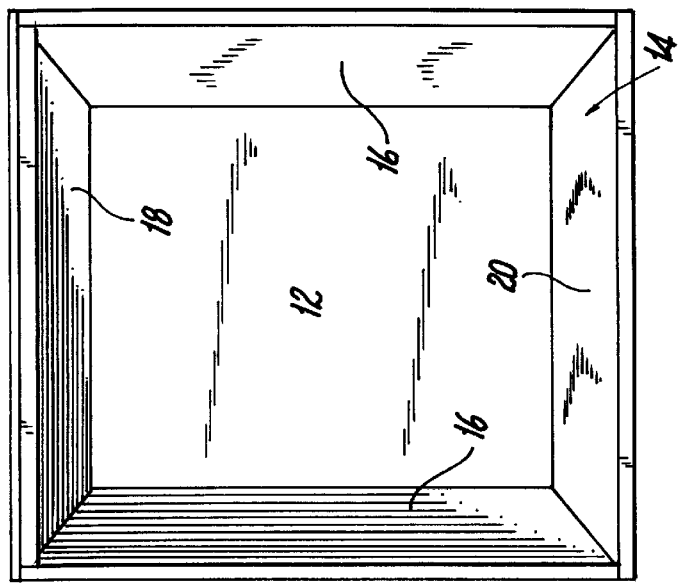
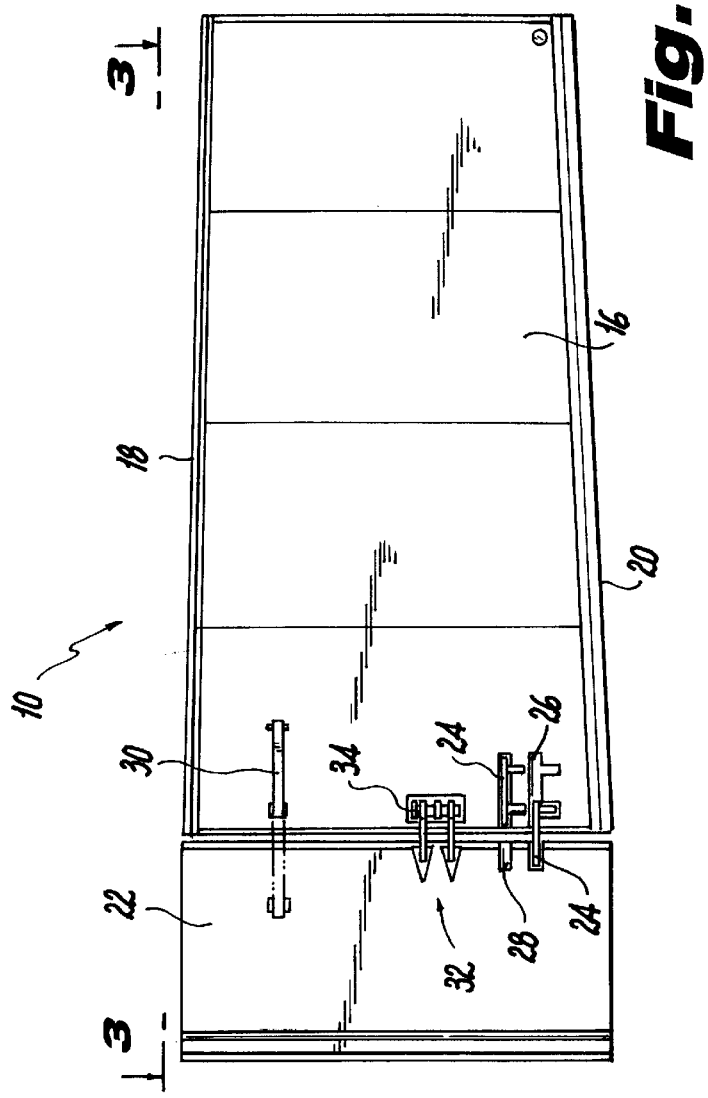

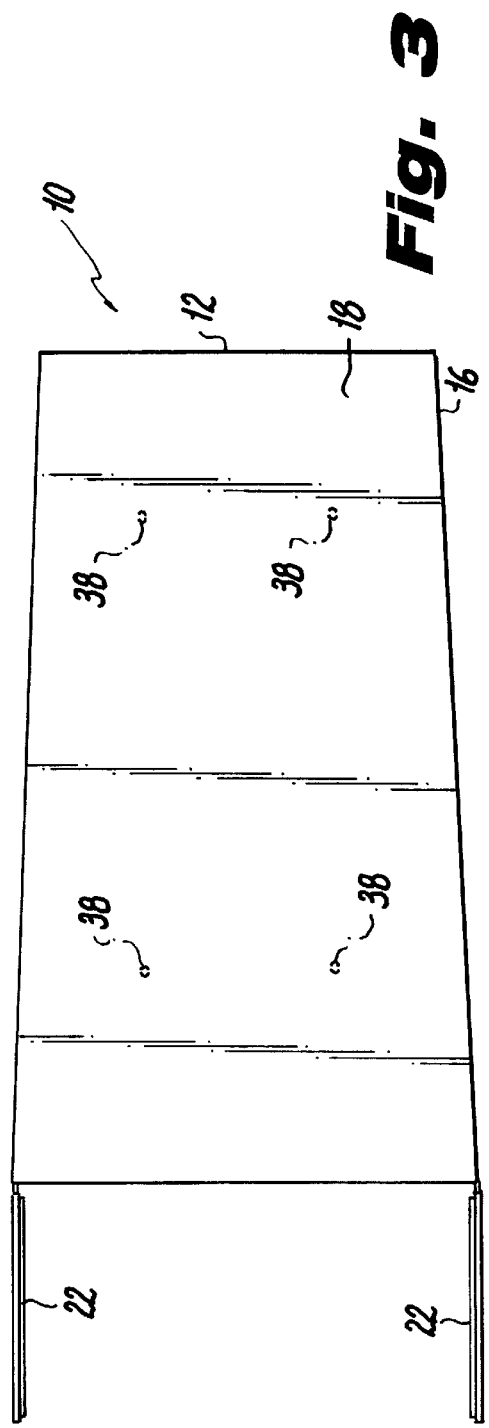
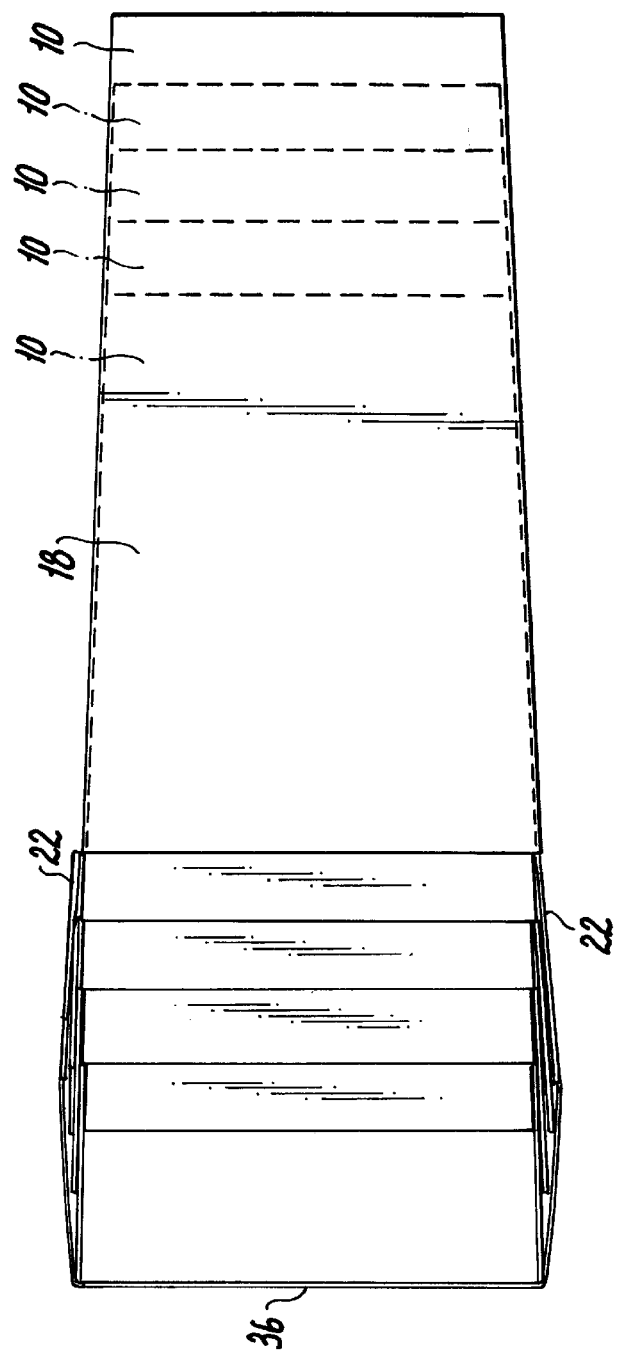

PIGGYBACK TRUCK TRANSPORT SYSTEM

FIELD OF THE INVENTION

The present invention relates to economical storage and transport of trucks, and more particularly to a nested truck storage and piggyback transportation system.

BACKGROUND OF THE INVENTION

In recent times, environmental concerns have significantly focused on automotive transportation. Vehicle pollution and its detrimental affects on the atmosphere have led to federal and state regulations directed to vehicle pollution control devices. More particularly, the automotive industry has been compelled by federal and state regulations to comply with increasingly restrictive vehicle emission requirements.

Concerns relating to automotive use are not limited to their impact on the environment. The ever increasing costs of manpower, insurance, and petroleum products such as fuel and oil are also or paramount concern.

Solutions directed to these concerns may be mandated by federal and state regulation, or may be initiated by the automotive industry as evidenced by the downsizing of engines by car manufacturers during the gasoline shortage of the late seventies. Additionally, individuals and business have attempted to devise and utilize methods to minimize the use of petroleum products, such as taxi sharing, carpooling, and the like. However, the fact remains that reducing the consumption of. petroleum based products has become a national, if not, global concern.

Minimizing the unnecessary use and or operation of vehicles is one approach, and when that approach is utilized by industries or very large companies where automotive use is integral to their operation, substantial financial savings and decreased adverse affect on the environment may be realized. Furthermore, when these approaches are directed to trucks, the financial benefits and decreased adverse affects are even greater. This is because trucks are generally equipped with very large displacement engines designed to pull the heavy loads associated with the anticipated fully loaded conditions that trucks experience during their service lives. Accordingly, they emit more emissions than cars, are less fuel efficient than cars and consequently cost more to operate. They are particularly inefficient when carrying a light load, such as when being transported without a body or cargo therein. Thus, individuals, businesses, and industries that utilize trucks have additional incentive to employ means and measures that reduce their overall usage, especially when such usage is unnecessary.

Perhaps the simplest method for transporting a plurality of vehicles while driving only one is via a ball hitch arrangement, which consists of a ball assembly mounted on the rear of the towing vehicle and receptacle assembly mounted on the front of the item to be towed. In such an arrangement, the receptacle is first raised and then dropped over the ball to achieve coupling. The ball may then be secured in the receptacle by additional securing means such as a pin, chain, padlock, or other manner. This and other similar arrangements achieve what is commonly known as flat towing.

The ball and receptacle type arrangement is not without deficiency. The arrangement provides a pivot point between the two trucks, e.g., at the ball hitch, which diminishes the control of both vehicles. Furthermore, since all the wheels of the towed vehicle are in contact with the ground in such an arrangement, steering control is further diminished, and front tire wire of the towed vehicle accelerated greatly. In general, towing arrangements which do not require all the wheels of the towed vehicle to be on the ground provide more steering control than contrary arrangements.

Truck cabin, drivetrain and frame assemblies are commonly sent from their manufacturers to a truck body company that installs the truck body and the auxiliary and optional equipment, paints the vehicle, and takes any other steps required to arrive at a complete vehicle ready for use. Accordingly, for the sake of clarity the terms cab or truck as used in appropriate context herein, may refer to the cabin, drivetrain and frame assembly of an otherwise complete and functional truck, but for the installation of the body. Truck manufacturers shipping such cab assemblies to dealerships and or end users have utilized a method to transport these items that enables the transportation of a plurality of such incomplete trucks while requiring only one truck to be operational, i.e., a lead truck which tows the remaining trucks in piggyback fashion.

This piggyback method of towing involves frontal structure of the truck to be towed being raised and coupled to rearward structure of the leading vehicle. Most commonly, the system employs a fifth wheel hitch, gooseneck or other type of receiver of the towing or lead vehicle to be coupled to the front axle of the vehicle to be towed, such front axle typically being known as a "dead" or beam type axle. The coupling may be accomplished via a depending pin assembly which is mounted to the front axle for receipt by the aperture of the fifth wheel hitch or by some other receiver on the towing or lead vehicle. In the case of a twin drive axle tractor, the fifth wheel hitch is located between the two parallel pairs of drive wheels at the rear of the truck, since this central location over the two wheel axles provides the adequate support for the truck's rated load. Placing the fifth wheel hitch rearward of the drive wheels could cause the lead vehicle to "pop a wheelie" under such a load, although this would not be the case under the load of the cab of the piggyback truck, which should be substantial less than the rated load. Using this towing location, the front wheel of the towed vehicle must be removed prior to coupling since they interfere with the rotation of the two parallel pairs of drive wheels. Thus, while a plurality of trucks may be towed in such an arrangement, the front wheels of all the trucks to be towed must first be removed.

These methods may also be used for smaller trucks which have only one axle of drive wheels. Similarly, the fifth wheel hitch is located near the single pair of drive wheels in order to adequately support either a truck or truck body, and likewise requires removal of the front wheels of the vehicle to be towed.

An improved method over those previously described is delineated in U.S. Pat. No. 4,867,468, incorporated herein by reference, as if more fully set forth. Therein, Paul, et. al., teaches an improved method which dispatches with the need for the front wheels to first be removed from the trucks that are to be towed. This feature is achieved by the mounting of a decking bar on the truck to be towed, across the chassis transverse to the longitudinal axis, in front of and above axle of its front wheel assembly. This decking bar is then engaged and supported by a saddle arrangement mounted to the towing truck's chassis, rearward of the fifth wheel hitch. Since the decking bar is located forward of the front axle of the vehicle to be towed and the saddle arrangement is located rearward of the fifth wheel hitch of the towing vehicle, the front wheels of the vehicle to be towed are now placed behind the two parallel pairs of drive wheels. This rearward location of the front wheels eliminates interference with the drive wheels and thus allows for the front wheels to remain on the towed vehicle. Unfortunately, patent '468 is limited to the towing of incomplete trucks.

While the above mentioned systems and methods allow a plurality of trucks to be towed, they do not aid in the transportation of multiple truck bodies. Nor can the benefits of such systems be exploited once truck bodies are associated with the trucks to be transported therewith. To the extent that a plurality of truck bodies can be transported simultaneously, present methods simply allow for a truck and truck body to be coupled to another truck body in tandem flat towing fashion. Therefore, the number of truck bodies that can be transported is limited to two truck bodies per lead or towing vehicle. Additionally, in such a configuration, the overall length of the entire configuration may present space, vehicle control, and insurance problems.

Accordingly, it would be desirable to have an apparatus and method which allows a plurality of trucks with bodies to be transported simultaneously. It would further be desirable to have an apparatus or method which allows for the transportation of a plurality of truck bodies in little more space than is required for a single truck body.

The benefits of such an apparatus relate to the gained efficiency in being able to transport a plurality of truck bodies simultaneously. For example, significant savings in fuel and manpower cost associated with transporting truck bodies individually or in pairs may be realized by implementation of the present invention. Moreover, vehicle wear such as brake, transmission, and engine wear, is limited to a single lead or towing vehicle, with the exception being the tires of the vehicles being towed which are in contact with the ground. Furthermore, implementation of the present invention allows for drastic reductions in automotive emissions associated with transporting truck bodies individually or in pairs, in as much as a single engine is used in a situation more closely approximating its rated load, thereby improving its efficiency.

With the advent of truck rental companies, a need exists to be able to transport not only multiple trucks but also the multiple truck bodies therefor, since very often people rent complete trucks to go from a first location to a second location and then return the complete truck at an office of the truck rental company located at the second location. These arrangements are commonly referred to as one-way rentals. Eventually, the truck rental company will likely desire that the truck be returned to the first location. For example, a person may rent a truck in New York to transport items to Pennsylvania and may consequently drop the truck off at the rental company's Pennsylvania location. At some point, the rental company may need to get several such empty trucks back to New York.

Alternately, a truck manufacturer may simply wish to transport a plurality of new trucks, both trucks and truck bodies, from the point of manufacture to a dealership or end user.

Furthermore, shipping companies, as well as any other type of business which utilizes multiple trucks, may desire that their trucks be moved from one location to another. For instance, several trucks may be needed to deliver goods to a "single" location but then the empty trucks may have to return to a base location. It would be uneconomical and environmentally unsound to have the several trucks drive back to the base station separately when they could be coupled together and transported by a single lead or tow vehicle.

Furthermore, another possible concern of truck rental companies or other industries or companies which utilize a plurality of trucks is the space required to store these trucks when they are not in operation on a regular basis. The cost of real estate can be a significant factor in the operation of a business, and since the current trend of big business are toward downsizing and maximizing efficiency, the efficient use of real estate can play a vital role in these goals.

Indeed, the storage of trucks may conceivably require a great deal of real estate. Therefore, the ability to nest truck bodies within each other offers the option of drastically reducing land use requirements with respect to truck storage.

Nestable containers are also well known. U.S. Pat. No. 5,281,073, incorporated herein by reference as if more fully set forth, provides an Apparatus for the Transport and Management of Liquid Bearing Waste. Therein, Gesuale provides an apparatus which allows for the storage and transport of a plurality of such containers when they are empty. The invention comprises an open top bulk material bin which tapers in dimension from top to bottom so as to enable a number of empty bins of similar construction to be nested vertically within one another, in little more space than is required for the storage of a single such container.

Consequently, a need exists for a variation upon a combination of the above described devices and methods, having trucks and bodies constructed to facilitate the more efficient storage and transportation of a plurality of such truck bodies simultaneously than enabled by devices and methods heretofore known. Furthermore, it is desired that storage and or transportation of a plurality of truck bodies require little more space than is required for a single truck body.

OBJECTS AND ADVANTAGES

It is therefore an object of the instant invention to provide a truck body which is of a construction that enables the majority thereof to nest within another empty truck body of similar construction, so that a plurality of empty truck bodies may be efficiently stored or transported in little more space than is required for a single truck body.

It is another object of the present invention to allow the transportation of a plurality of trucks and bodies therefor while requiring only one lead or towing vehicle.

Another object of the instant invention is to provide a means for reducing vehicular emissions associated with transporting a plurality of trucks and bodies therefor from one location to another.

A further object of the instant invention is to provide a means for reducing fuel consumption associated with transporting a plurality of trucks and bodies therefor from one location to another.

Yet another object of the instant invention is to provide a means for reducing manpower costs associated with transporting a plurality of trucks and bodies therefor from one destination to another.

It is another object of the instant invention is to provide a means for reducing insurance costs associated with transporting a plurality of trucks and bodies therefor from one destination to another.

A further object of the instant invention is to provide a means for reducing automotive wear associated with transporting a plurality of trucks and bodies therefor from one destination to another.

Another object of the instant invention is to provide a means for transporting a plurality of trucks and truck bodies in less space than would be required if they were coupled in tandem.

Yet another object of the instant invention is to provide a means for transporting a plurality of trucks and bodies therefor in piggyback fashion.

Other objects advantages of the present invention will become apparent to those of skill in the art upon contemplation of the disclosure herein in conjunction with the drawings.

SUMMARY OF THE INVENTION

According to the instant invention, a truck body constructed to facilitate nesting of similarly constructed truck bodies is provided, in order to enable the efficient storage or transportation of a plurality of truck bodies. The present invention comprises a truck body which, when viewed from the back of the truck body where the doors are normally located, is tapered in height and width, decreasing in these dimensions from the back of the truck body to the front of the truck body. Thus, the truck body decreases from a maximum height and width at the back of the truck body, to a minimum height and width at the front of the truck body. This structural configuration enables a plurality of the truck bodies to be nested within one another when empty, with the major portion of one truck body fitting within another similarly constructed truck body. Utilization of the present invention described herein in conjunction with known methods for towing a plurality of trucks, some of which have also been described herein, allows for the towing of a plurality of trucks and truck bodies simultaneously. Consequently, the present invention is directed at reducing, et al, vehicular emissions, fuel, manpower, and insurance costs, vehicle wear, and real estate requirements associated with the storage, transport and management of multiple trucks.

BRIEF DESCRIPTION OF THE DRAWINGS

In the drawings, wherein the same reference numeral indicates the same element throughout the several views:

FIG. 1 is a diagrammatic representation of a truck body of the instant invention as viewed from the back of the truck body looking directly forward to the front of the truck body, doors not shown.

FIG. 2 is a side view of the truck body of FIG. 1, illustrating several means for immobilizing the doors.

FIG. 3 is a top view of the truck body of FIG. 1 as taken along section line 3—3 of FIG. 2.

FIG. 4 is an illustration of several of the truck bodies of FIG. 2 as nested within one another for storage or transport.

DESCRIPTION OF THE PREFERRED EMBODIMENTS

Figure 5:
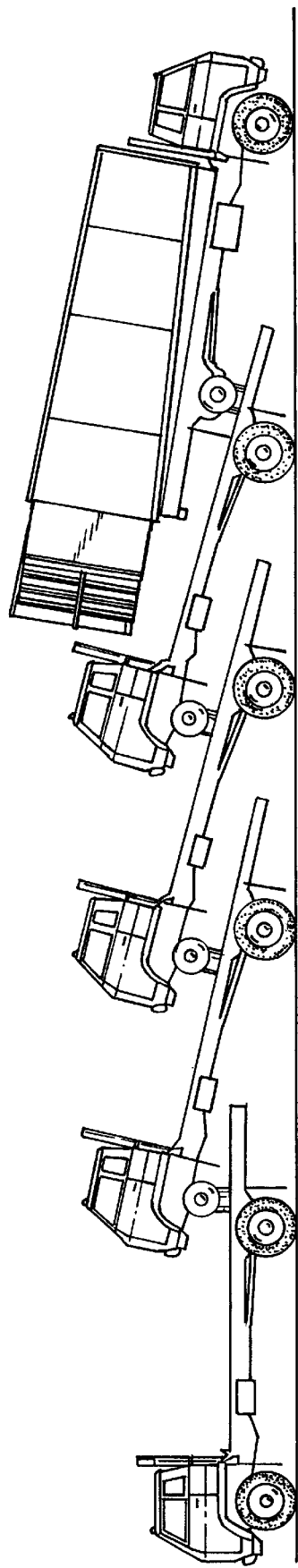
FIG. 5 is an illustration of the present invention, integrated with a previously known and described method for transporting a plurality of truck cabs.

Turning to FIG. 1, a first embodiment of a nestable truck body according to the present invention is shown, generally designated by the numeral 10. The truck body has a front face 12, which is typically adjacent to the truck cab, a back open end 14, 2 sides 16, a top face 18, and a bottom face 20. FIG. 1 depicts a view of the present invention looking from the back open end 14 of the truck body to the front face 12 of the truck body. As FIG. 1 illustrates, the truck body 10 tapers in height and width, decreasing in dimensions from a maximum width and height at the back open end 14 of the truck body, to a minimum width and height at the opposite end of the truck body, i.e., the front face 12. This configuration allows the efficient nesting of several of the truck bodies within one another when the containers are empty. Doors 22 are not shown in the illustration of FIG. 1.

While it is obvious that the truck bodies of the above described embodiments may be made of any size or shape, the preferred shapes, prior to the tapering of width and height, are substantially square or rectangular. Since it is likely that a significantly application of the present invention will be directed towards the smaller trucks commonly used for one way rentals by consumers, the nominal dimensions of the truck body contemplated by the best mode of the present invention are 10 feet long, 8 feet high, and 8 feet wide. Furthermore, the preferred thickness of the walls of the truck bodies is nominally two inches, which allows for adequate strength of a truck body carrying conventional cargo. Additionally, a six inch taper has been determined sufficient for nesting truck bodies of the above general dimensions, although it will be obvious to those of skill in the art that the spirit and scope of the instant invention contemplates variation of these dimensions and configurations as necessary to suit differing applications.

Turning now to FIG. 2, the side view of the basic embodiment of FIG. 1 is shown. This view depicts the outside of the truck body, which decreases in height and width from the back open end 14 to the front face 12 of the truck body 10.

While doors 22 are not deemed essential to practice of the instant invention, they are typically included with truck bodies in order to prevent loss of the contained cargo, and consequently, are contemplated by the present invention. Since it would be undesirable and potentially dangerous to leave these doors free to swing out of control during transportation FIG. 2 shows several of the numerous methods contemplated for securing the doors of the truck body in an open position to facilitate nesting and to prevent undesirable swaying of the truck body doors. The methods illustrated in FIG. 2 are described as applied to one door so that the description may be clearly understood, although such provisions are deemed preferably applied to both doors. The first shown method consists of a sliding bolt 24, located within a guide 26 upon or within the side wall 16 of the truck body, which may be slid along the guide 26 into receiving aperture 28 located upon or within the wall of a truck door 22. In such a configuration, the door 22 must be open to the extent that it is in substantial alignment and at a similar angle to the adjacent side wall 16 of the truck body, as shown in FIG. 2. Then the bolt 24 may be slid rearward from an unengaging position in the side wall 16 of the truck body, to an engaging position through both the side wall 16 of the truck body and the wall of the truck door 22. Bolts 24 and corresponding receivers 28 may also be mounted to the outer surfaces of the body and doors, however this is not deemed preferable due to possible interference with nesting action. Means for securing the bolt in either position is contemplated.

Another method contemplated for securing the doors in an open position is via the use of arms 30 which pivot from an unengaging position on each side wall 16 of the truck body, as shown in FIG. 2, to an engaging position when the door 22 is open and substantially in alignment with the angle of the adjacent side wall 16 of the truck body. The arms 30 are preferably located within the side wall 16 of the truck body, at the edge near the back open end 14, and are pivotably mounted at one end to the side wall 16 of the truck body. At least one arm 30 is required on each face of both side walls 16 in order to secure a door in an open position by restricting movement on both faces of the door 22, although, as above, a single arm 30, would be preferable if located within side wall 16, and adapted to engage a slot or other receiving means in the outer edge of door 22 so as not to constitute an external protrusion which would interfere with nesting action. As shown in FIG. 2, the arms 30 may be pivoted rearwardly to engage the door 22 and restrict its movement and pivoted up to disengage the door 22 and allow movement. Means for securing the arms the either position is contemplated.

An additional method for securing the doors of the truck body in an open position is via an assembly similar to the hinge arrangement used to attach the door to the truck body. Typical door hinges consist of three parts, two hinge type parts 32 having eyelets, and a dowel pin 34. In such an arrangement, one part of the hinge is mounted to the rear of side wall 16 of the truck body and the other part of the hinge is mounted to a door 22. The two hinge parts are designed so that apertures of the eyelets of both hinge parts line up when a truck body door 22 is in alignment and at a similar angle to the adjacent side wall 16 of the truck body. When the apertures are aligned, a pin may be dropped in the apertures, which may be supported from falling through by a head on the pin or a plate mounted under the lowest aperture.

Any other of the numerous suitable known methods for securing the doors in an open position are contemplated for use by the present invention. Such other methods may include the use of straps, cables, ropes, chains, or other like tension element, 36, shown in FIG. 4 strung preferably between the outermost doors of either side, or any other known means. Note that the doors of the last truck nested in a group may be closed, and are accordingly not shown. Thus, the present invention may be used not only to transport a group of empty nested containers, but additionally, the last container of the group may also contain cargo.

A top view of the basic embodiment of FIG. 2 along section 3—3 is shown in FIG. 3. This view depicts the width of the truck, body, which decreases in magnitude from the back open end 14 to the front face 12 of the truck body. Four mounting holes 38 are shown on the bottom face 20 of the truck body for mounting the truck body to the rails of a truck frame. Thus, when it is desired for a plurality of truck bodies to be nested together for transport or storage, the means used to secure the truck body to the truck frame may be disengaged so that the truck body may be separated from the truck frame. The best mode of the present invention contemplates the use of four bolts for the smaller trucks associated with one way rentals. However, numerous alternative means for accomplishing this will be obvious to those of skill in the art, and any of those means are contemplated for use without departing from the scope and spirit of the present invention provided that they do not constitute protrusions or obstructions which could interfere with nesting.

FIG. 4 illustrates an overhead view of a nested group of the truck bodies of FIG. 1, the major frontal portion of each truck body fitting within the cavity of the truck body preceding it. As the illustration of FIG. 4 reveals, the construction of the truck bodies described in the present invention enables the nesting of several truck bodies in only slightly more spaced than is required for a single truck body, so that a plurality of such empty truck bodies can be stored or transported. In the case of transport, the efficient nestable design of the described embodiment results in substantial conservation of fuel when compared to the numerous trips that would be necessary to transport non nestable truck bodies. Furthermore, vehicle wear associated with transporting non nesting truck bodies individually or in pairs is minimized or avoided by implementation of the present invention.

The conservation aspects of the present invention are further magnifies when the present invention is utilized in the embodiment illustrated in FIG. 5. Utilization of the embodiment depicted in FIG. 5 allows for the simultaneous transportation of a plurality of truck cabs and truck bodies. FIG. 5 depicts five truck cabs piggybacked, the last truck cab being reversed and carrying five nested truck bodies. Five truck bodies is the preferred maximum number of truck bodies to be nested together for reasons of size and security. The first truck cab is the lead or tow vehicle. The first four truck cabs are facing forward and attached to each other by conventional piggyback means of attachment as described earlier herein. The last truck cab remains attached to its truck body, carrying the four truck bodies removed from the leading cabs nested within the fifth, undetached truck body. The last truck body is likewise towed in piggyback fashion, except that it is facing rearwards, with the tail end thereof being raised at the rear for mounting to the rear frame of the next to last truck to facilitate towing.

In this configuration of FIG. 5, it can be seen that the nested truck bodies are held in place during normal operation by gravity and friction since the last cab is inclined towards its forward end due to the mounting method described above. Additionally, the truck bodies are held in place during forward motion by the principles of momentum and inertia. Sudden stops can overcome these forces, indicating the use of some means for securing the nested bodies together for safety. This highlights the value of FIG. 4 element 38, strap, cable, rope, chain or the like being strung between the outermost doors, for in addition to being easily implemented, it controls both the swinging of the doors, and prevents relative motion of the nested bodies. Therefore, in the configuration of FIG. 5, five truck cabs and five truck bodies may be simultaneously transported safely by the operation of only one truck cab or other drive mean.

While the above description contains many specificities, these should not be contrued as limitations on the scope of the instant invention, but rather as an exemplification of the preferred embodiments thereof. Accordingly, the scope of the instant invention should not be determined by the embodiments shown, but rather by the claims appended hereto and their legal equivalents.

What is claimed is:

1. A truck body comprising:
   an open ended container, said container having top and bottom walls, a pair of opposing side walls between said top and bottom walls, and a second end having a wall between said top bottom and side walls at the second ends thereof, said top and bottom walls being tapered in width from a maximum width at the first ends thereof, to a minimum width at the second ends thereof, and said side walls being tapered in height from a maximum height at the first ends thereof, to a minimum height at the second ends thereof, said container being progressively smaller from the first end thereof to the second end thereof, so that said container is able to be nested substantially within another truck body of similar construction.

2. The truck body as set forth in claim 1, further comprising one or more doors affixable near the open end of said container, so that the open end of said container is able to be closed.

3. The truck body as set forth in claim 2, wherein said one or more doors are securable in an open position so that said one or more doors are in substantial alignment with said side walls.

4. The truck body as set forth in claim 1, said truck body being couplable to or uncouplable from the frame of a truck chassis.

5. The truck body as set forth in claim 1, wherein said first end is the rear of said container, and said second end is the front of said container.

6. The truck body as set forth in claim 2, wherein said one or more doors are affixed at the rear of said container.

7. The truck body as set forth in claim 2, wherein said one or more doors are pivotably affixed to said container.

8. The truck body as set forth in claim 7, wherein said one or more doors are pivotably affixed at the rear of said container.

9. The truck body as set forth in claim 6, wherein said one or more doors are affixed at the rear of said container and securable in an open position so that said one or more doors are in substantial alignment with said side walls.

10. The truck body as set forth in claim 9, wherein said one or more doors and pivotably affixed at the rear of said container and securable in an open position so that said one or more doors are in substantial alignment with said side walls.

11. The truck body as set forth in claim 6, said truck body being couplable to or uncouplable from the frame of a truck chassis.

12. A method of transporting a plurality of truck bodies from one location of another while requiring only one towing vehicle or other drive means, comprising the steps of:
   selecting a drive means;
   providing a plurality of tapered truck bodies to be delivered;
   nesting the plurality of truck bodies within one another;
   coupling the outermost nestable truck body to said drive means; and using said drive means to tow said plurality of nestable truck bodies from the first location to the second location.

13. An improved method for transporting a plurality of trucks and nestable bodies therefor, said method comprising the steps of:
   selecting a trailing truck from a plurality of trucks to be transported and nesting the one or more bodies of the remaining of said plurality of trucks into the body of said trailing truck;
   coupling the frames of said plurality of trucks together in piggyback fashion so that a string of trucks is created, with said trailing truck being the last of said string of trucks; and driving the first of said trucks so that the remaining of said plurality of trucks are towed thereby.

14. The method as set forth in claim 13, wherein said trailing truck is reversed in longitudinal orientation so that the rear of said trailing truck is raised and coupled to the rear frame of the truck preceding it in said string of trucks so that said trailing truck is towed in piggyback fashion, and said reversed orientation of said trailing truck serves to secure or stabilize said nested one or more bodies of said remaining trucks within said body of said trailing truck.

15. The method as set forth in claim 13, further comprising the step of securing the doors of one or more of said truck bodies in an open position of substantial alignment with the wall of said truck body.

* * * * *